May 12, 1959 S. A. EMERSON 2,885,827
PROCESS OF MAKING A MULTIFOCAL LENS BLANK
Filed Nov. 8, 1952

INVENTOR.
Stanley A. Emerson
BY
ATTORNEY

United States Patent Office 2,885,827
Patented May 12, 1959

2,885,827
PROCESS OF MAKING A MULTIFOCAL LENS BLANK

Stanley Alfred Emerson, Dayton, Ohio

Application November 8, 1952, Serial No. 319,568

4 Claims. (Cl. 49—82.1)

My invention relates to improvements in the process of making ophthalmic lenses.

An object of the present invention is to provide a method for making a trifocal lens having a relatively wide intermediate field as compared to the reading field.

Another object of the present invention is to provide a method for making a trifocal lens which provides great flexibility in minor field shape and power selection, and which, at the same time, provides a dividing line of desirable configuration between the two minor fields.

Another object of the present invention is to provide a method for making a trifocal lens which provides great flexibility in positioning the optical centers of inserted minor field segments.

Another object of the present invention is to provide a process of making a multifocal lens of lapped button construction in which a portion of the dividing line between the minor fields is free of any objectionable shoulder, and in which the remaining portion of such dividing line has only a negligible shoulder of minimized width.

Another object of the present invention is to provide a process of making a trifocal lens having a wide intermediate field which does not interfere with the distance field, with such lens, at the same time, having a dividing line of desirable configuration between the minor fields.

These advantages are obtained by my novel method of construction which comprises securing two overlapping buttons to a main blank of optical glass. One of such buttons is compositely formed so that a portion of its area becomes essentially a portion of the main blank upon fusing the button to the blank. Another portion of this button is of different refractive index from that of the main blank to provide a minor field for the lens.

To provide a second minor field, a second button is then secured to the main blank so that a portion of its area overlaps a portion of the first mentioned button, with the refractive index of the second button being the same as the refractive index of that portion of the first mentioned button which provides said first mentioned minor field. At the same time, each of the two buttons is provided with a curved rear surface that registers with a corresponding curved surface on the main blank. A proper curvature is selected for the rear surface of each button to produce the desired power for the particular minor field produced by such button. In addition, the two buttons are positioned on the main blank in lapped relationship so that such rear surfaces intersect.

To provide a desirable interfield delineation between the two minor fields of the lens, the curved surface of the countersink, for the overlapping second button, is ground into the main blank and underlying button. I form such second countersink surface in the proper location and of the proper depth to intersect the rear surface of the underlying button, with a portion of such intersection occurring in the minor field forming portion of the underlying button. As a result, a visible interfield delineation will be formed with part of such delineation occurring at the intersection of the curved rear surfaces of the respective minor field buttons. Such portion of the delineation will be centrally located relative to the total length of interfield delineation, and at such central portion no objectionable shoulder will be present.

At the same time, on each side of such shoulderless delineation portion, only a negligible, non-objectionable shoulder will be present, with such shoulder decreasing in width toward the central shoulderless portion of the delineation.

In other words, I utilize two buttons having their effective minor field forming portions of the same refractive index. These minor field forming portions are positioned in lapped relationship on the main blank. The surfaces of mutual contact between the lapped portions of the buttons are fused together so that such lapped portions become essentially a single piece of glass.

In the present invention, however, a central portion of the visible interfield delineation is present due to the fact that the respective rear surfaces of the buttons are formed with different curvatures. This means that when the eye shifts from one minor field to the other minor field, the eye will experience a change in field power. As such change in field power is due to the difference in curvature between the respective rear surfaces of the two buttons, the visible interfield delineation necessarily occurs at the intersection of the rear surfaces of the two buttons.

Further objects and advantages of the present invention will be apparent from the following description, reference being had to the accompanying drawings wherein preferred forms of embodiments of the invention are clearly shown.

Figure 1:
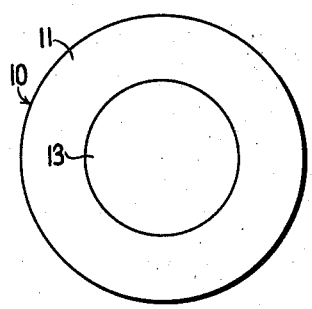
Fig. 1 is an elevation of a main lens blank used in the present invention.
Figure 2:
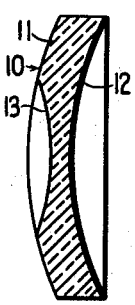
Fig. 2 is a vertical section corresponding to Fig. 1.
Figure 3:
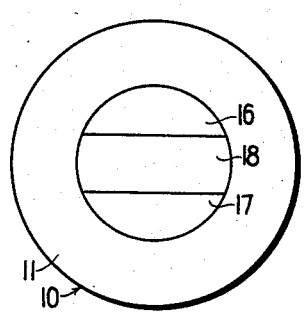
Fig. 3 is a second elevation of the blank of Fig. 1.

Referring to the drawing and more particularly to Fig. 1, a main blank of optical glass is shown at 10. This blank is formed with a front surface 11 and a rear surface 12 as best seen in Fig. 2. The front surface is provided with a countersink portion which is formed by grinding the surface or primary recess 13 into the front portion of the blank.

Figure 4:
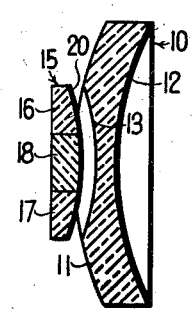
Fig. 4 is a vertical section corresponding to Fig. 3.
Figure 5:
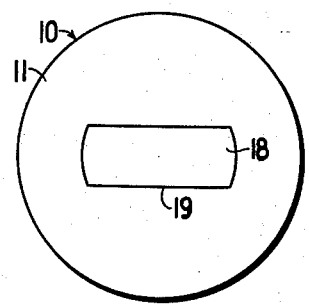
Fig. 5 is a third elevation of the blank of Fig. 1.
Figure 6:
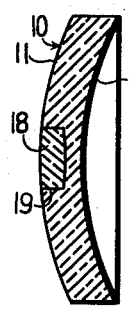
Fig. 6 is a vertical section corresponding to Fig. 5.

A button indicated generally at 15 is shown in Fig. 4. Such button is preferably formed in three portions. An upper portion 16 and a lower portion 17 are formed of glass having the same refractive index as that of the main blank so that when the button 15 is secured to the main blank such upper and lower portions of the button 15 can be fused to the main blank, thereby becoming essentially a portion of such main blank. The upper portion 16 and lower portion 17 are shown in fused relationship with the main blank in Figs. 5 and 6.

The button 15 is also provided with an intermediate portion 18 which is formed of glass having a different refractive index from that of the main blank. It is this intermediate portion 18 of the button 15 that serves as one of the minor optical fields in the finished lens. Fig.

5 is an elevational view showing a preferred shape for the minor field formed by the intermediate portion 18 of button 15.

A curved rear surface 20 is formed on the rear portion of button 15 as shown in Fig. 4. The surface 20 is formed with essentially the same radius as the curve 13 which was ground into the front portion of the main blank. The curvature of the surface 13 is selected to provide the desired power for the minor field portion 18.

Figure 8:
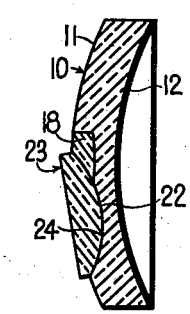
Fig. 8 is a vertical section corresponding to Fig. 7.

After grinding off the surplus stock of the button 15 and reducing the insert 18 to a predetermined shape and size by further grinding of the surface 11, a second curved surface or secondary recess 22 is then formed in the front portion of the main blank as shown in Fig. 8. Part of the area of such surface extends on the intermediate portion 18 of the button 15. A second button 23 is formed of glass having the same refractive index as that of the intermediate portion 18 of the first button 15. The rear portion of the button 23 is provided with a curved surface 24 with such surface being adapted to register with the curved surface 22. It should be noted that the curvature of the surfaces 22 and 24 is selected to provide the desired power for the second minor field area, as such second minor field is furnished by the second button 23.

Figure 7:
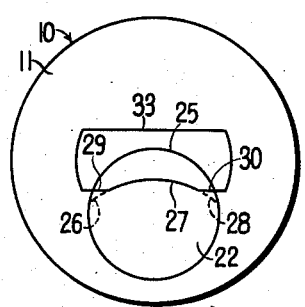
Fig. 7 is a fourth elevation of the blank of Fig. 1.
Figure 9:
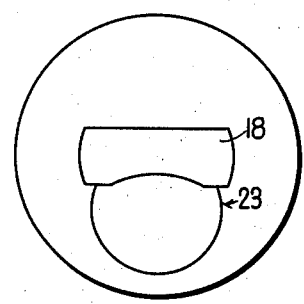
Fig. 9 is a fifth elevation of the blank of Fig. 1.
Figure 10:
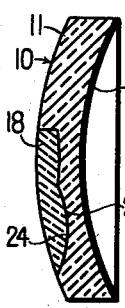
Fig. 10 is a vertical section corresponding to Fig. 9.

When the second button 23 is secured to the main blank a portion of such button overlaps the intermediate portion of the first button 15. Before the second button 23 is secured to the main blank the elevational view will appear as shown in Fig. 7. It may be seen in Fig. 7 that at this stage the border 25 of the second button will still be visible as the peripheral edge of the upper portion of such button. This border portion 25 later becomes invisible after the overlapping portions of the two buttons have been fused together and after the blank and button have been topsided. Figs. 9 and 10 show the blank and buttons after these operations have been performed.

As the surfaces 13 and 22 are of different radii, these two surfaces will have an intersection 27 which appears as a curve in the plan view of the lens as seen in Fig. 7. The ends of the intersection 27 are shown dotted at 26 and 28. Thus, the complete intersection of surfaces 13 and 22 are shown by the curve segments 26, 27 and 28. The dotted lines 26 and 28 will, however, not be visible due to the fact that the lower portion 17 of the underlying button was formed of glass of the same refractive index as that of the main blank.

The true interfield delineation is formed by the line between the two minor fields at which the shift in optical power occurs. The central portion of the delineation is represented by the arc 27 of Fig. 7. This arc 27 is produced by the intersection of the countersink depression surfaces 13 and 22. It should be noted that no objectionable shoulder will be present along the arc 27 due to the fact that in grinding the surface 22 the whole of the surface 13 extending below the arc 27 has been completely removed and, therefore, with it all that part of the bottom shoulder 19 of button 15.

The remaining portions of the interfield delineation between the two minor fields lie on each side of the arc 27 and are represented by the straight line segments 29 and 30 in Fig. 7. Along the portions of the delineation indicated at 29 and 30, slight shoulders will be present due to the fact that the rear surface 24, on the overlying button, intersect the plane bottom surface 19, Figs. 5 and 6, of the minor field portion 18. These resulting shoulders are slight and are of negligible optical effect. In addition, the shoulders decrease in width in an inwardly direction from a maximum at the border of the lower minor field with the shoulders terminating at the ends of the arc 27.

At this point it will be noted that a portion of the interfield delineation between the two minor fields occurs along the line segments 29 and 30 rather than along the dotted arcs 26 and 28, as seen in Fig. 7. Such is necessarily true since the underlying glass, on one side of such dotted lines is of the same refractive index as the underlying glass on the other side of such dotted lines.

Figure 11:
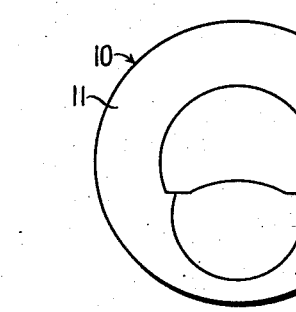
Fig. 11 shows a second lens constructed in accordance with the present invention.

Fig. 11 shows a modification which embodies the present invention. This lens is made in the same manner as the method just described except that the underlying button 15 that provides the upper minor field area is composed of two portions instead of three portions as previously described. This button modification results in a lens, such as is shown in Fig. 11, having a curved border 34 for the upper minor field instead of the straight border as is shown at 33 in Fig. 7.

Figure 12:
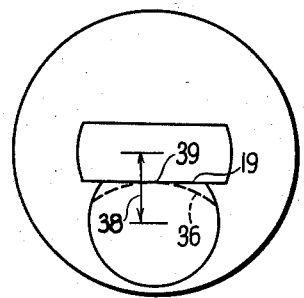
Fig. 12 shows a third lens constructed in accordance with the present invention.

Fig. 12 shows another modification which embodies the present invention. In such modification the intersection of the rear surfaces 20 and 24 is again in the form of an arc 36, as seen in Fig. 12. Such arcuate intersection 36 is made tangent to the lower border 19 of the minor field portion 18 of the underlying button. This condition of tangency, which is present in the lens of Fig. 12, is obtained by constructing the lens as previously described, and by selecting the proper length for the dimension 38 which represents the distance between the centers of the surfaces 13 and 22. In addition, the proper relationship between the diameters of the surfaces 13 and 22 must be selected. In this construction no shoulder will be present at the point of tangency 39 which is located on the interfield delineation. In this instance, the interfield delineation occurs at the lower border 19 of the minor field portion 18. A slight shoulder will be present along the balance of the interfield delineation 19. Such shoulder originates on each side of the point of tangency 39, increases in width in an outwardly direction along the line 19, and again decreases to nothing at the two outside ends of the line 19.

In the lens of Fig. 12 the interfield delineation will be free of any shoulder only at the central point of tangency 39, but the entire interfield delineation will appear as a straight line as seen in Fig. 12. In contrast, in the lens of Figs. 1 through 10, the interfield delineation will be free of shoulder along the entire arcuate portion 27, but only the end portions 29 and 30 of the interfield delineation will appear as straight lines as seen in Fig. 7.

Figure 13:
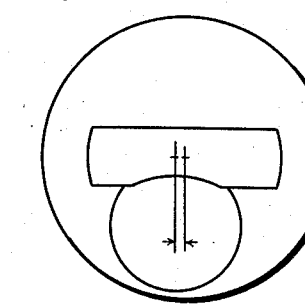
Fig. 13 shows a fourth lens constructed in accordance with the present invention.

Fig. 13 shows another modification which embodies the present invention. This lens is similar to the lens of Figs. 1 through 10, except that one of the minor fields is shown offset nasally relative to the other minor field, and the upper minor field has been increased in lateral extent.

While the forms of embodiments of the present invention as herein disclosed constitute preferred forms, it is to be understood that other forms might be adopted, all coming within the scope of the claims which follow:

I claim:
1. The steps in the method of forming a multifocal lens, comprising forming a curved primary recess in a main blank of optical glass; placing, in the recess, a substantially segment-shaped button of optical glass of different index of refraction from that of the main blank and having a curved rear surface substantially complementing the curved surface of the recess; thereafter forming, in the main blank and the button, a secondary curved recess intersecting the curved surface of the primary recess and of such a depth that the intersection extends to at least the junction of the lower, innermost edge of the segment of the button, having the different index of refraction from that of the main blank, and the portion of the main blank therebelow; placing, in the secondary recess, a second button of optical glass having a curved surface substantially complementing the curved surface of the secondary recess; and then bonding the second button with the surface of the secondary recess on the first button and the glass of the main blank.

2. The steps in the method as defined in claim 1 characterized in that the buttons are of the same index of refraction.

3. The steps in the method as defined in claim 1 characterized in that the intersection of the curved surfaces of the primary and secondary recesses lie substantially tangentially at the mean plane of junction of the buttons.

4. The steps in the method as defined in claim 1 characterized in that the main blank is formed of lower index of refraction than the buttons and that the buttons are of the same index of refraction.

References Cited in the file of this patent

UNITED STATES PATENTS

| | | |
|---|---|---|
| Re. 19,142 | Hancock | Apr. 24, 1934 |
| 1,158,102 | Bolde | Oct. 26, 1915 |
| 1,587,130 | Tillyer | June 1, 1926 |
| 1,632,208 | Watson et al. | June 14, 1927 |
| 1,907,810 | Hill | May 9, 1933 |
| 2,006,638 | Hammon | July 2, 1935 |
| 2,033,573 | Hancock | Mar. 10, 1936 |
| 2,053,377 | Price | Sept. 8, 1936 |
| 2,053,551 | Culver et al. | Sept. 8, 1936 |
| 2,065,132 | Hammon | Dec. 22, 1936 |
| 2,071,616 | Culver et al. | Feb. 23, 1937 |
| 2,177,021 | Hammon | Oct. 24, 1939 |
| 2,177,022 | Hammon | Oct. 24, 1939 |
| 2,405,826 | Hammon | Aug. 13, 1946 |
| 2,447,068 | Hammon | Aug. 17, 1948 |
| 2,755,706 | Cole | July 24, 1956 |

FOREIGN PATENTS

| | | |
|---|---|---|
| 440,438 | Great Britain | Dec. 30, 1935 |